W. J. MILLER.
AUTOMOBILE THIEF ALARM.
APPLICATION FILED DEC. 17, 1919.

1,387,798.

Patented Aug. 16, 1921.

INVENTOR
Wilbur J. Miller,
BY
Fraentzel & Richards,
ATTORNEYS

UNITED STATES PATENT OFFICE.

WILBUR J. MILLER, OF NEWARK, NEW JERSEY.

AUTOMOBILE THIEF-ALARM.

1,387,798.　　　　Specification of Letters Patent.　　Patented Aug. 16, 1921.

Application filed December 17, 1919. Serial No. 345,475.

*To all whom It may concern:*

Be it known that I, WILBUR J. MILLER, a citizen of the United States, residing at Newark, in the county of Essex, and State of New Jersey, have invented certain new and useful Improvements in Automobile Thief-Alarms; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates to improvements in thief alarms for automobiles; and the invention has reference to a novel electrically controlled alarm adapted to operate when an unauthorized person sits in the driver's seat and attempts to operate the automobile.

The invention has for its principal object to provide a novel arrangement of electric circuits comprising a normally closed actuating circuit, including a novel arrangement of circuit breaking switch operated by the weight of an unauthorized person occupying the driver's seat of an automobile, and a normally open alarm circuit, adapted to be concealed, and operated or closed to actuate the alarm when said actuating circuit is broken.

With the various objects of the invention in view, the same comprises the several novel features of construction and combinations of parts which will be hereinafter more fully set forth, and finally embodied in the appended claims.

The invention is clearly illustrated in the accompanying drawings, in which:—

Similar characters of reference are employed in all of the hereinabove described views, to indicate corresponding parts.

Figures 1, 2:
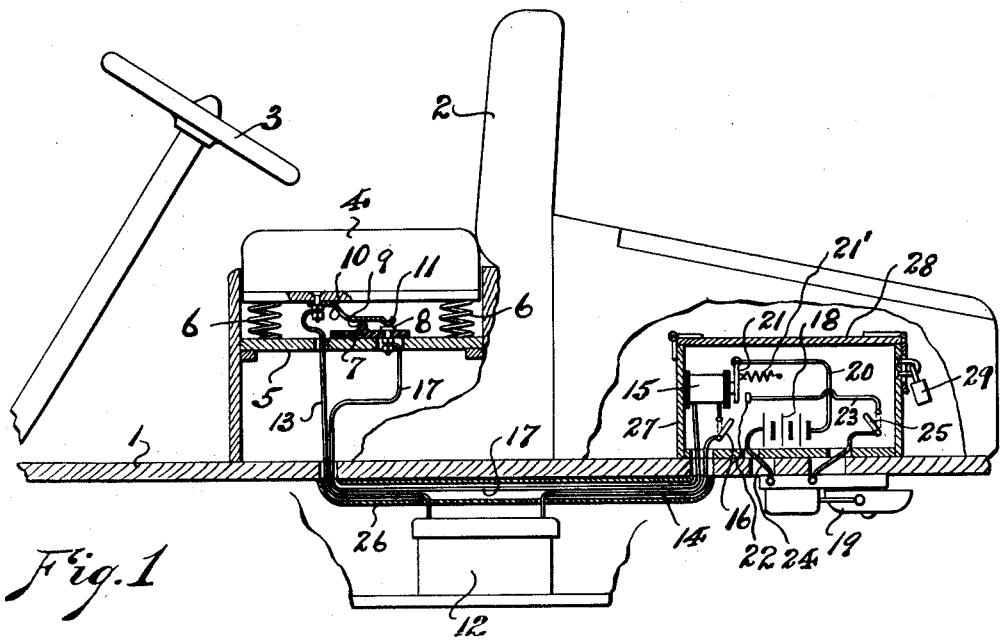
Figure 1 is a part side view and part vertical longitudinal section of portions of an automobile, illustrating, in partly diagrammatic representation, the novel auto thief alarm made according to and embodying the principles of my present invention.
Fig. 2 is a diagrammatic illustration of the electrical arrangement and relation of the respective actuating circuit and alarm circuit comprising my novel thief alarm.

Referring now to the said drawings, the reference-character 1 indicates the floor of an automobile body upon which is supported the driver's seat 2 behind the steering wheel 3. Beneath the seat cushion 4 of the driver's seat is the supporting shelf 5 therefor, said seat cushion 4 being supported by springs 6 from said shelf 5, and in normally upwardly spaced relation thereto. Secured upon said shelf 5 is a base 7 of insulating material, in which is mounted, so as to be exposed on its upper surface, a contact-piece 8, said base 7 being provided, adjacent to one side of said contact-piece 8, with a perpendicular lug or fulcrum member 9. Secured to the under side of said seat cushion is a resilient or leaf spring contact member 10, the main body of which is engaged upon said lug or fulcrum member 9, so that its free end 11, which provides a contact point, normally rests in circuit closing contact with said contact piece 8. The reference-character 12 indicates the storage battery, forming part of the usual equipment of an automobile. One pole of said storage battery 12 is electrically connected by the circuit wire 13 with said leaf-spring contact member 10. A circuit wire 14 leads from the other pole of said storage battery 12 to one pole of a relay device 15, said circuit wire 14 including any desirable form of manually operatable switch device 16. The other pole of said relay device 15 is connected by a circuit wire 17 with said contact piece 8. When said manually controlled switch device 16 is closed, the above described circuit devices provides a normally closed electric circuit, through which current flows from and back to said storage battery source.

The reference-character 18 indicates a battery, preferably comprising a desired number of dry cells, and the reference-character 19 indicates an electric alarm bell, or other desired form of electrically actuated alarm or signal means. One pole of said battery 18 is connected by a circuit wire 20 with the armature piece 21 of said relay 15. The reference-character 22 indicates a contact receiving member fixed to receive the circuit closing engagement of said armature piece 21, when the same is released from the electrical control of said relay 15, upon the interruption or breaking of the above described normally closed circuit serving said relay, so that it is subject to the pull of a spring 21' adapted to swing the same toward said contact receiving member. Said contact receiving member 22 is connected by a circuit wire 23 with one pole of said electric alarm bell, the other pole of the latter being connected by a circuit wire 24 leading back to said battery 18. Said circuit wire 23 includes any form of manually operatable switch device 25, although the said switch device 25 may be placed in any other position in the alarm circuit if desired. It will be apparent that said alarm circuit, constituted as above described, is maintained in normally interrupted condition, by means of the relay and its armature piece when said actuating circuit is closed.

Such wires of said actuating circuit as may run in unconcealed exposure either underneath the automobile body, or otherwise, may be inclosed in a metallic conduit pipe or armor 26 if desired.

Preferably the relay device 15 and the manually controllable actuating circuit switch device 16, together with the battery 18, switch device 25, and circuit wires of the alarm circuit, are concealed in a box or casing 27 provided with a lid, door or other means of access 28 thereinto, which may be closed and locked by a key-controlled lock 29, the key of which is carried by the owner of the automobile or his representative. The said box or casing 27 may be mounted in any convenient place in connection with the automobile body. Preferably the alarm bell 19 is located exteriorly of said box or casing 27, and under the floor 1, the circuit wires leading thereto being preferably concealed in said floor.

When the owner is about to leave the automobile standing in a public place, he unlocks the box or casing 27 with his private key, opens the same, manipulates the manually operatable switch devices 16 and 25, thus closing the actuating circuit, and setting the alarm circuit ready for operation. The box or casing 27 is then closed and locked. The actuating circuit is now closed so that current flows through the relay 15, thereby holding said armature piece 21 away from the contact receiving member 22, and thus maintaining the alarm circuit broken or interrupted. If an unauthorized person or thief now attempts to get into the automobile to drive the same away, and consequently seats himself in the driver's seat 2 behind the steering wheel 34, his weight depresses the seat cushion 4. The downward movement of the seat cushion 4 presses the leaf spring contact member 10 downwardly upon the lug or fulcrum member 9 of the base 7, thereby tipping upward the free end of said leaf spring contact member causing its contact point 11 to rise away from the contact piece 8 of said base 7, thus breaking or interrupting the actuating circuit, so that the current from the storage battery 12 ceases to flow through the relay 15, and consequently the relay no longer influences the armature piece 21 thereof. The armature piece 21 being thus released from its electrically arrested position, the same is swung outwardly by its spring 21, and carried into circuit closing engagement with the contact receiving member 22 of the normally open alarm circuit, whereby said latter circuit is immediately closed, and the alarm bell is sounded and continues to sound so long as the driver's seat is occupied.

If the thief leaves the driver's seat the actuating circuit is again closed, and the relay 15 is again energized to move the armature piece 21 into alarm circuit breaking position, so that the alarm bell ceases to ring.

If, however, the thief attempts to rip up and remove the seat cushion 4, or seeks out the wiring of the actuating circuit to cut or break the same, it will be apparent that the actuating circuit will be again interrupted, thereby again deënergizing the relay 15, so that the alarm circuit will be closed and the alarm sounded, and when the actuating circuit is thus interrupted in a destructive manner, the alarm circuit will, of course, remain closed, and the alarm will continue to sound leading to a swift discovery and apprehension of the thief.

I am aware that some changes may be made in the several arrangements and combinations of parts comprising my novel thief alarm, as well as in the details of the construction of said parts, without departing from the scope of my invention as described in the foregoing specification, and as defined in the appended claims. Hence, I do not limit my invention to the exact arrangements and construction of parts, as described in the foregoing specification, nor do I confine myself to the exact details of the construction of said parts as illustrated in the accompanying drawings.

I claim:—

1. In a circuit breaker for use in automobile thief alarm actuating circuits, the combination with an automobile seat of a fixed contact, a fulcrum lug adjacent to said fixed contact, a seat cushion, springs intermediate said seat and said cushion for holding the latter in normally raised position, and a leaf-spring contact on the under side of said cushion, said leaf-spring contact normally extending across said fulcrum lug with its free end in engagement with said fixed contact but adapted to be rocked on said fulcrum lug by a downward movement of said cushion to raise said free end away from said fixed contact.

2. In a circuit breaker for use in an automobile thief alarm actuating circuits, the combination with an automobile seat of a base of insulating material fixed thereto, a contact-piece carried by said base, a fulcrum lug connected with said base and spaced from said contact-piece, a seat cushion, springs intermediate said seat and said cushion for holding the latter in a normally raised position, a leaf-spring contact member secured to the under side of said cushion, said leaf-spring normally extending across said fulcrum lug with its free end in circuit closing contact with said contact-piece but adapted to be rocked on said fulcrum lug by a downward movement of said cushion to raise said free end away from said contact-piece.

In testimony that I claim the invention set forth above I have hereunto set my hand this 13th day of December, 1919.

WILBUR J. MILLER.

Witnesses:
BARBARA SUTTERLIN,
GEORGE D. RICHARDS.